United States Patent

Bacon

Patent Number: 5,666,851
Date of Patent: Sep. 16, 1997

[54] FUEL SENDER COMPENSATION ARRANGEMENT

[75] Inventor: Donald R. Bacon, Chelmsford, United Kingdom

[73] Assignee: Ford Motor Company, Dearborn, Mich.

[21] Appl. No.: 516,764

[22] Filed: Aug. 18, 1995

[30] Foreign Application Priority Data

Aug. 27, 1994 [GB] United Kingdom ............... 9417331

[51] Int. Cl.$^6$ ........................................... G01F 23/32
[52] U.S. Cl. ............................... 73/317; 73/313; 338/33; 340/625
[58] Field of Search .................. 73/311–314, 317–20, 73/305; 340/623–625; 338/33; 116/228, 229

[56] References Cited

U.S. PATENT DOCUMENTS

| Re. 34,679 | 8/1994 | Ritzenthaler et al. | 73/317 |
|---|---|---|---|
| 3,925,747 | 12/1975 | Woodward et al. | 73/317 |
| 4,184,370 | 1/1980 | Schlick et al. | 338/33 |
| 4,790,185 | 12/1988 | Fedelem et al. | 73/317 |
| 5,085,078 | 2/1992 | Baux et al. | 73/313 |
| 5,167,156 | 12/1992 | Tozawa | 73/317 |
| 5,284,055 | 2/1994 | Baux et al. | 73/317 |
| 5,375,467 | 12/1994 | Banse | 73/317 |

FOREIGN PATENT DOCUMENTS

| 0-043-391 | 6/1990 | European Pat. Off. | |
| 0-483-001 | 10/1991 | European Pat. Off. | |
| 1938119 | 2/1971 | Germany | 73/317 |
| 33-10-704 | 5/1984 | Germany | |
| 40-35-321 | 5/1991 | Germany | |
| 44-09-554 | 9/1994 | Germany | |
| 1276956 | 6/1972 | United Kingdom | |

*Primary Examiner*—Thomas B. Will
*Assistant Examiner*—Andrew Hirshfeld
*Attorney, Agent, or Firm*—Neil P. Ferraro

[57] ABSTRACT

A liquid level sender device for measuring a level of a liquid in a tank having a first wall and a bottom wall includes a bracket mounted to the first wall of the tank, a first potentiometer mounted on the bracket, a float arm movably connected to the bracket and cooperating with the first potentiometer to generate a first variable resistance which varies according to the position relationship between the bracket and the float arm, a float mounted on the float arm which moves according to the level of the liquid in the tank and moves the float arm accordingly, a second potentiometer mounted on the bracket, and a compensation arm biased against the bottom wall of the tank and movably connected to the bracket, where the compensation arm cooperates with the second potentiometer to generate a second variable resistance which varies according to the position relationship between the bracket and the compensation arm. The first and second variable resistances are electrically connected to generate an output resistance which corresponds to the level of the liquid in the tank.

11 Claims, 3 Drawing Sheets

FUEL SENDER COMPENSATION ARRANGEMENT

FIELD OF THE INVENTION

The present invention relates to a liquid level sender device for monitoring the volume of liquid contained in a vessel, and, more particularly, to a fuel level sender device for monitoring the level of fuel in the fuel tank of a motor vehicle.

DESCRIPTION OF THE RELATED ART

Conventionally, fuel level sender devices have been mounted in fuel tanks to monitor the volume of fuel within the tank at all times. Traditional systems have included a float at an end of a float arm which floated on the fuel within the tank, and a contact at an opposite end of the float arm which traveled across a resistance track in a known manner. The electrical resistance of the track corresponded to the position of the contact upon it.

While this worked well for conventional metal fuel tanks, disadvantages arose when current practice within the motor industry turned to using molded fuel tanks manufactured from plastics. Favored for their inherent savings in materials, manufacturing costs, and weight, molded fuel tanks differed from metal tanks in that they were capable of deforming, especially when full or empty. Additionally, the properties of plastics from which these fuel tanks are manufactured may change due to absorption, variations in manufacturing tolerances, or the aging of the plastics material with time. Alternatively, deformation of the walls of the fuel tank may occur, due to instantaneous factors such as the pressure within the tank, or changes in the external ambient conditions.

In the conventional fuel level sender device, this variation in the position of the walls of the tank made it possible for the position of the float relative to the top wall of the fuel tank to vary according to the position of the bottom wall of the fuel tank. In turn, such variances could reduce the accuracy of the fuel level sender device in indicating the volume of liquid remaining in the fuel tank to the driver of the vehicle. It would thus be desirable to have a liquid level sender device which overcomes the aforementioned difficulties.

SUMMARY OF THE INVENTION

A liquid level sender device for measuring a level of a liquid in a tank having a first wall and a bottom wall includes a bracket mounted to the first wall of the tank, a first potentiometer mounted on the bracket, a float arm movably connected to the bracket and cooperating with the first potentiometer to generate a first variable resistance which varies according to the position relationship between the bracket and the float arm, a float mounted on the float arm which moves according to the level of the liquid in the tank and moves the float arm accordingly, a second potentiometer mounted on the bracket, and a compensation am biased against the bottom wall of the tank and movably connected to the bracket, where the compensation arm cooperates with the second potentiometer to generate a second variable resistance which varies according to the position relationship between the bracket and the compensation arm. The first and second variable resistances are electrically connected to generate an output resistance which corresponds to the level of the liquid in the tank.

A primary object of the present invention is to provide a new and improved liquid level sender device for measuring the level of a liquid in a deformable tank. More specifically, it is an object of the present invention to more accurately measure the level of fuel in a plastic fuel tank.

A primary advantage of this invention is that changes in the level of a liquid caused by deformations in the tank which contains that liquid can be accounted for in measuring the level. An additional advantage is that the invention accommodates both temporary and permanent deformations in the fuel tank.

Other objects, features, and advantages will be apparent from a study of the following written description and drawings.

DETAILED DESCRIPTION OF THE PREFERRED EMBODIMENTS

Figure 1:
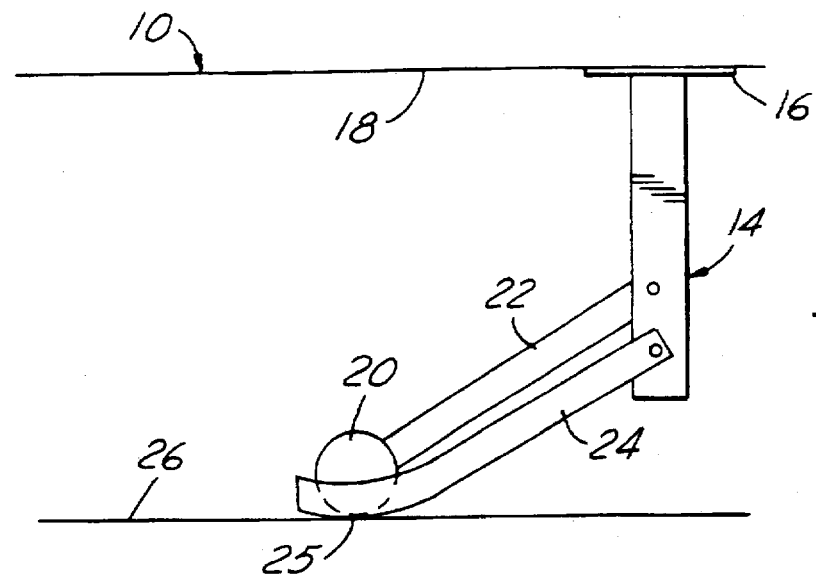
FIG. 1 shows a view of an empty fuel tank and liquid level sender device according to a preferred embodiment of the present invention.
Figure 2:
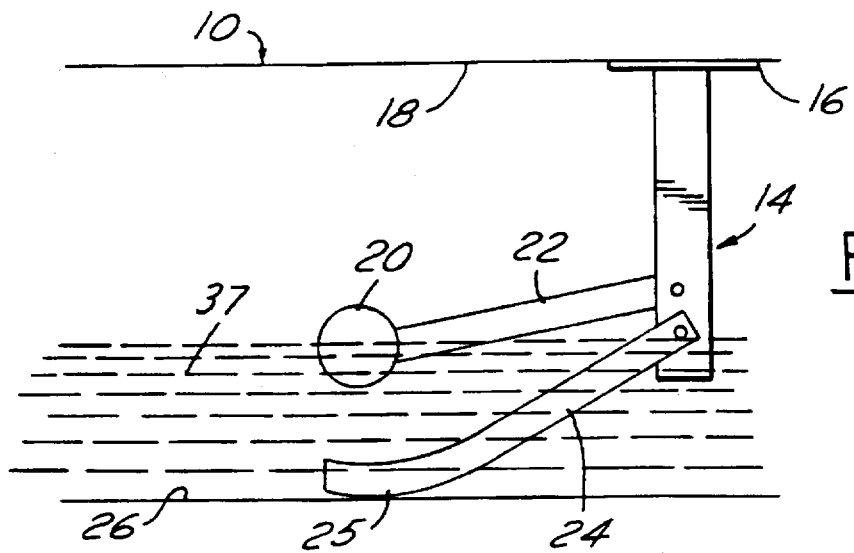
FIG. 2 shows a view of a partially filled fuel tank and liquid level sender device according to a preferred embodiment of the present invention.
Figure 3:
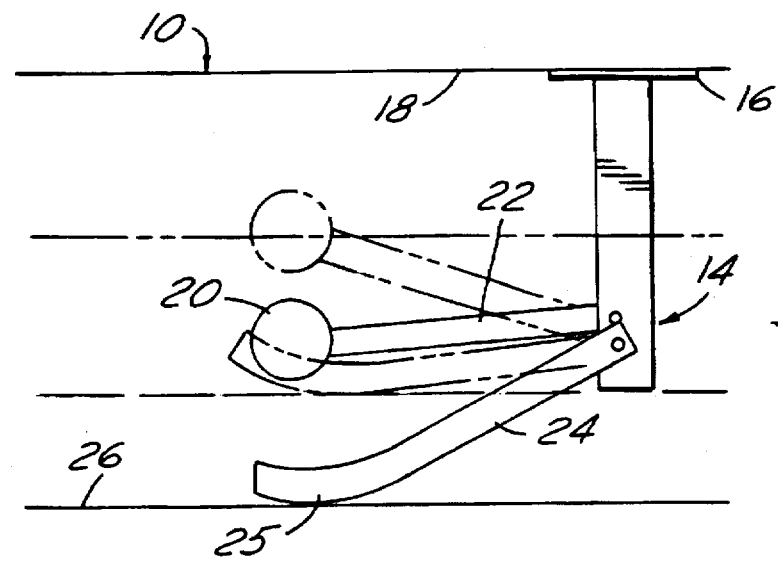
FIG. 3 shows a view of a partially deformed fuel tank and liquid level sender device according to a preferred embodiment of the present invention.
Figure 6:
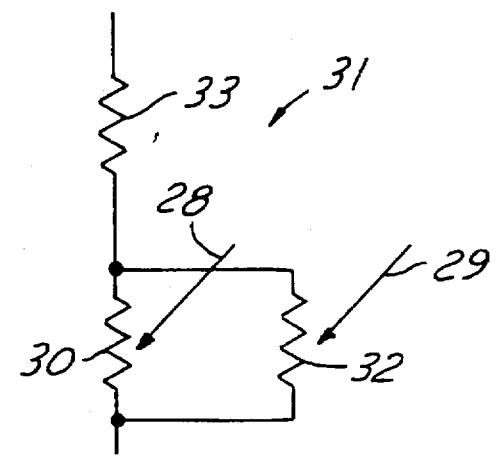
FIG. 6 shows an electrical control circuit for a preferred embodiment of the present invention.

Referring now to FIG. 1, a plastic fuel tank 10 with top wall 18 and bottom wall 26 contains a liquid level sender device 14 mounted internal to tank 10. The liquid level sender device 14 includes a float 20 at an end of a float arm 22, and a foot 25 at an end of a compensation arm 24. Float arm 22 and compensation arm 24 are each pivotally connected to a bracket 16, as shown in FIGS. 1–3, which is mounted on top wall 18 of tank 10. Float arm 22 and compensation arm each have contacts 28, 29 as shown in FIG. 6, which travel across resistance tracks 30, 32 and are connected on opposing ends to float 20 and foot 25. As shown in FIG. 1, the weight of compensation arm 24 and foot 25 are used to bias foot 25 against bottom wall 26 of tank. However, note that in a preferred embodiment, compensation arm 24 is biased against bottom wall 26 of tank 10 by means of a spring 38, shown in FIG. 7, to ensure that the position of foot 25 always corresponds to the position of bottom wall 26.

Referring now to FIG. 2, a partially filled fuel tank and liquid level sender device according to the present invention illustrate a typical measuring scenario. The position of float arm 22 varies with the volume of fuel 37 within tank 10, upon the top surface of which float 20 floats. Application of fuel 37 into tank 10 causes float 20 to rise, as can be seen by contrasting the position of float 20 in FIG. 1 with that of FIG. 2. The position of compensation arm 24 depends upon the position of bottom wall 26, against which foot 25 rests. The position of the bottom wall 26 may change if, for example, there is a variation in the internal pressure of tank 10 or a change in external ambient conditions.

Referring now to FIG. 3, a measuring scenario is shown in which the position of the bottom wall 26 of the fuel tank 10 has changed relative to that of FIG. 2. This change, which could be flexing or deforming, might be due, for example, to changes in external ambient conditions or the internal pressure of tank 10. The solid lines of FIG. 3 show the tank being shaped as in FIG. 2, while the dotted lines of FIG. 3 show the repositioned bottom wall 26 and its effect on reference arm 24, foot 25, float arm 22 and float 20. As FIG. 3 shows, the change in the position of bottom wall 26 indicated by dotted line causes fuel 37 and float 20 to be moved upward accordingly, relative to their proper positions, as shown by the solid lines, for a partially filled fuel tank 10 without deformation of bottom wall 26. Note that since compensation arm 24 is biased against the bottom wall 26, it provides a reference for indicating the relative position of float 20 with respect to bottom wall 26.

When bottom wall 26 of the fuel tank 10 bows inwardly, as shown in FIG. 3 by the dotted level line, it causes the level of fuel 37 in tank 10 to rise accordingly, so float 20 and float arm 22 are driven upward as indicated by the broken lines. As can clearly be seen by comparing FIGS. 2 and 3, although an equivalent volume of fuel 37 is contained in tank 10, float 20 and float arm 22 of FIG. 3, if left uncompensated, would indicate that fuel tank 10 contained a volume of fuel 37 much greater than that contained in tank 10 as shown in FIG. 2.

Figure 4:
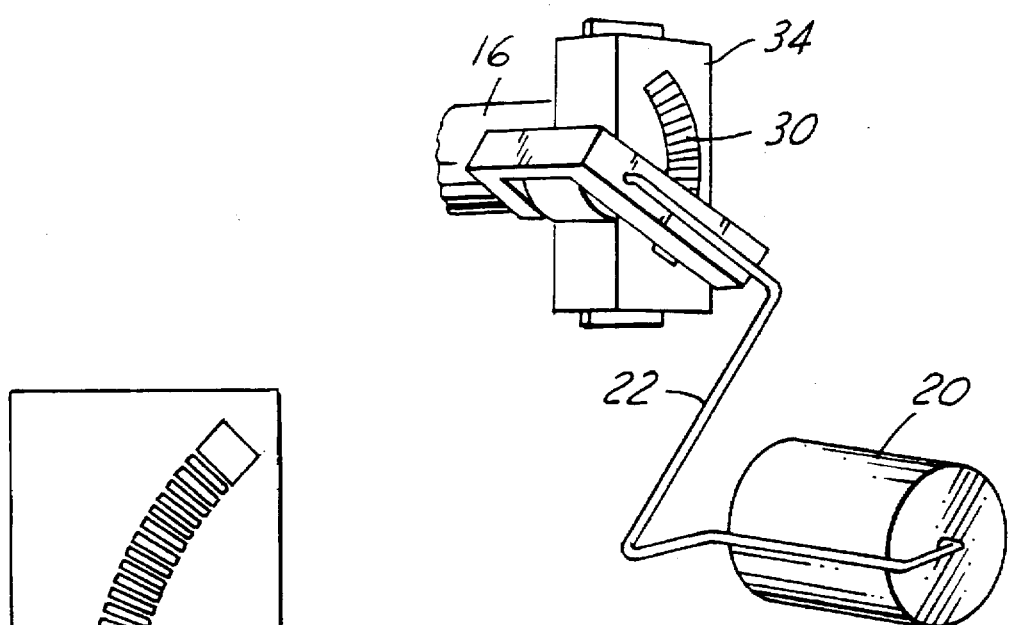
FIG. 4 shows a perspective of a float and float arm of a preferred embodiment of the present invention.

Referring now to FIG. 4, a perspective of a float and float arm of a preferred embodiment of the present invention includes a housing 34 having resistance tracks 30, 32 (resistance track 32 not shown in FIG. 4). Housing 34 includes contacts for registering the resistance indicated on resistance tracks 30, 32 by contacts 28, 29, which reside within float arm 22 and compensation arm 24. Float arm 22 is pivotally mounted on bracket 16. As float 20 is caused to rise by the ingress of fuel 37 into the tank 10, float arm 22 pivots about housing 34 causing contact 28 to travel along resistance track 30. Similarly, compensation arm 24 is pivotally mounted on bracket 16. As bottom wall 26 of tank 10 flexes or bows, it causes corresponding pivotal movement of compensation arm 24, which in turn causes contact 29 within compensation arm 24 to travel along resistance track 32. This change in resistance is reflected by circuitry within housing 34 and can be used by other systems (not shown) to register the level of fuel in tank 10.

Figure 5:
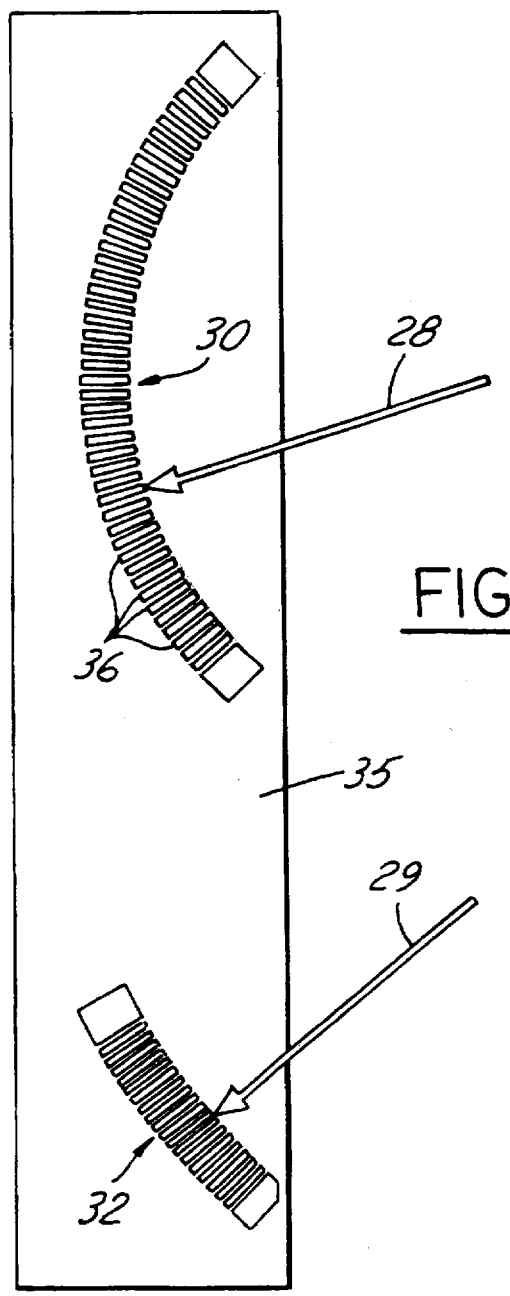
FIG. 5 is an enlarged detail of a resistance track of FIG. 4 for a preferred embodiment of the present invention.

Referring now to FIG. 5, each of resistance tracks 30 and 32 has a plurality of resistance elements 36 formed on the surface of a board 35, which in a preferred embodiment is mounted on the side of housing 34. The electrical resistance of resistance tracks 30 and 32 at any instant corresponds to the sum of the resistances of the elements 36 to one side of contact 28 or 29. Thus, as contact 28 or 29 travels along resistance track 30 or 32 it experiences either increasing or decreasing electrical resistance. Resistance tracks 30, 32 can thus be described as potentiometers for purposes of analyzing the position of contacts 28, 29. Note that while this preferred embodiment shows resistance tracks 30, 32 in the shape of arcs, straight resistance tracks could also be used. The desired shape of resistance tracks 30 and 32 is determined by the method of the mounting of arm 22, 24 (in which the contacts 28, 29 reside) upon bracket 16. For a pivotal mounting of arms 22, 24 to bracket 16, an arc-shaped resistance track is desirable. For a vertically sliding mounting of arms 22, 24 to bracket 16, a vertically linear resistance track 30, 32 is desirable. Note that in an embodiment which utilizes a vertically sliding mounting, contacts 28, 29 divide resistance tracks 30, 32 horizontally according to the relative position of arms 22, 24 within respect to tank 10.

Referring now to FIG. 6, resistance tracks 30, 32 are portrayed as potentiometers with the resistance of each varying according to the position of contacts 28, 29 on resistance tracks 30, 32. Resistance tracks 30, 32 are connected electrically in parallel and then electrically in serial to a biasing resistor 33, forming a resistance network 31. Note that biasing resistor 33 may be mounted integrally within a gauge or indication device and need not be included within the present invention itself. For network 31, the total resistance $R_{total}$ is equivalent to the result of the equation:

$$R_{total} = R_{bias} + \frac{1}{\left[\left(\frac{1}{R_{float\_arm}}\right) + \left(\frac{1}{R_{compensation\_arm}}\right)\right]}$$

where $R_{bias}$ is the value of biasing resistor 33 placed electrically in series with parallel resistance tracks 30, 32, $R_{float\_arm}$ is the resistance corresponding to the position of contact 28 of float arm 22 on resistance track 30, and $R_{compensation\_arm}$ is the resistance corresponding to the position of contact 29 of compensation arm 24 on resistance track 32.

Figure 7A:
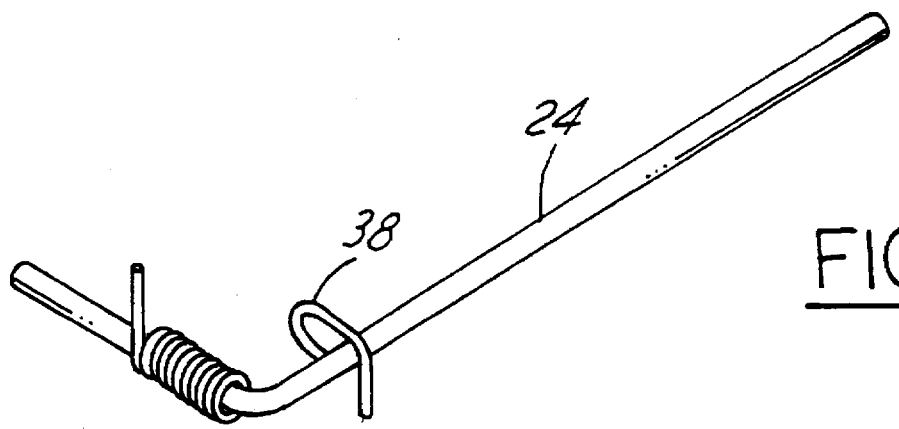
FIGS. 7A through 7C show perspective views of various means for biasing the compensation arm of the invention.
Figure 7B:
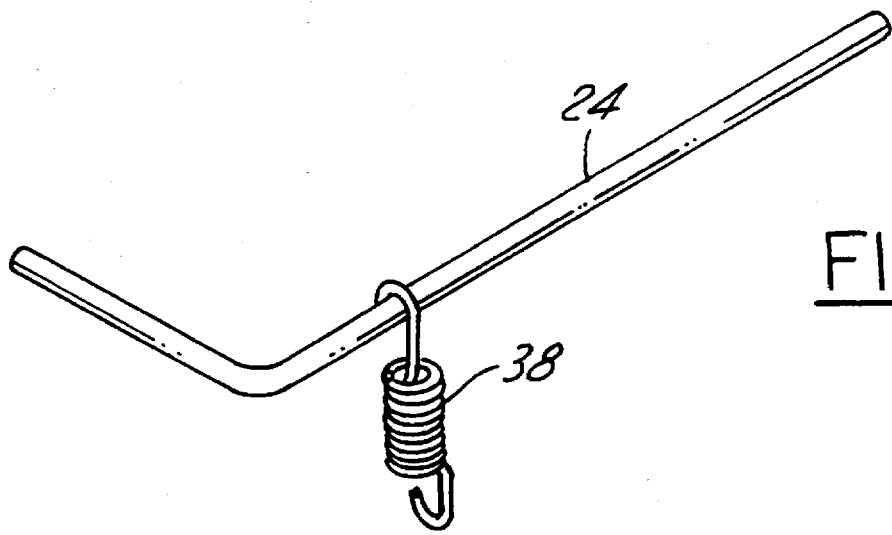
Figure 7C:
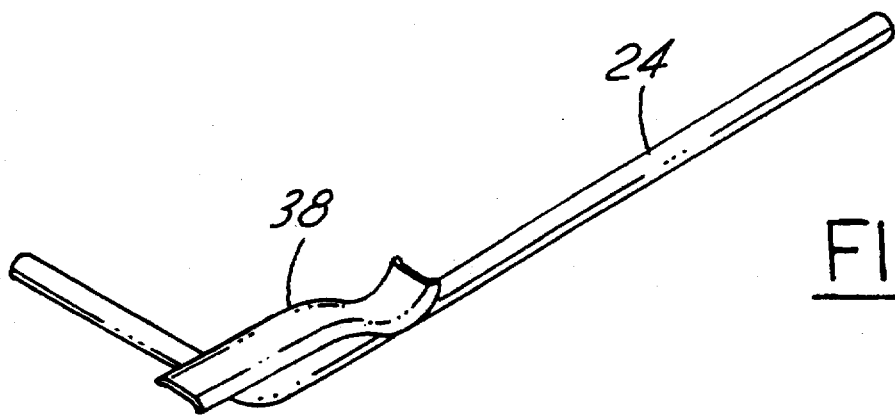

Turning finally to FIGS. 7A, 7B, and 7C, variations of biasing springs 38 for biasing compensation arm 24 against bottom wall 26 are illustrated. In FIG. 7A, a torsional spring 38 encircles compensation arm 24 on the end to be mounted in bracket 16 (not shown). Spring 38 rests against bracket 16 such that compensation arm 24 must overcome the spring force in order to rise. Similarly, in FIG. 7B a tension spring 38 is fastened to compensation arm 24 near the end to be mounted in bracket 16 (not shown). The other end of spring 38 may be fastened to bottom wall 26, such that compensation arm 24 must overcome the spring force in order to rise. Finally, in FIG. 7C a leaf or beam spring is mounted on bracket 16 (not shown) and presses against compensation arm 24 from the top. Compensation arm 24 must therefore flex spring 38 in order to rise. Note that while three types of springs are shown, the invention is not limited to the stated preferred embodiments. FIGS. 7A, 7B, and 7C merely illustrate a subset of the possibilities.

From the foregoing description, one ordinarily skilled in the art can easily ascertain the essential characteristics of this invention and, without departing from the spirit and scope of the claims, can make various changes and modifications to the invention to adapt it to various uses and conditions.

We claim:

1. A liquid level sender device for measuring a level of a liquid in a tank having a first wall and a bottom wall, comprising:

a bracket mounted to the first wall of the tank;

a first resistance track;

a float arm movably connected to said bracket and having a first contact cooperating with said first resistance track to generate a first variable resistance, said first variable resistance varying according to a relative position between said bracket and said float arm;

a float mounted on said float arm, said float being moveable in accordance with the level of the liquid in the tank and moving said float arm accordingly;

a second resistance track;

a compensation arm biased against the bottom wall and movably connected to said bracket, said compensation arm having a second contact cooperating with said second resistance track to generate a second variable resistance, said second variable resistance varying according to a relative position between said bracket and said compensation arm; and combining means for combining the first variable resistance with the second variable resistance into an output resistance corresponding to the level of the liquid in the tank.

2. A liquid level sender device according to claim 1, wherein said float arm and said compensation arm are pivotally mounted to said bracket.

3. A liquid level sender device according to claim 1, said compensation arm further comprising a foot for biasing said compensation arm relative to the bottom wall.

4. A liquid level sender device according to claim 1, further comprising a bias spring positioned between said bracket and said compensation arm for biasing said compensation arm against the bottom wall.

5. A liquid level sender device according to claim 1, further comprising a bias spring positioned between the bottom wall and said compensation arm for biasing said compensation arm against the bottom wall.

6. A liquid level sender device for measuring a level of a liquid in a tank having a first wall and a bottom wall, comprising:

a bracket mounted to the first wall of the tank;

a first potentiometer;

a float arm movably connected to said bracket and cooperating with said first potentiometer to generate a first variable resistance, said first variable resistance varying according to a relative position between said bracket and said float arm;

a float mounted on said float arm, said float being moveable in accordance with the level of the liquid in the tank and moving said float arm accordingly;

a second potentiometer; and a compensation arm biased against the bottom wall and movably connected to said bracket, said compensation arm cooperating with said second potentiometer to generate a second variable resistance, said second variable resistance varying according to a relative position between said bracket and said compensation arm, wherein the first variable resistance is electrically connected with the second variable resistance to generate an output resistance corresponding to the level of the liquid in the tank.

7. A liquid level sender device according to claim 6, wherein said float arm and said compensation arm are pivotally mounted to said bracket.

8. A liquid level sender device according to claim 6, said compensation arm further comprising a foot for biasing said compensation arm relative to the bottom wall.

9. A liquid level sender device according to claim 6, further comprising a bias spring positioned between said bracket and said compensation arm for biasing said compensation arm against the bottom wall.

10. A liquid level sender device according to claim 6, further comprising a bias spring positioned between the bottom wall and said compensation arm for biasing said compensation am against the bottom wall.

11. A method for measuring a level of a liquid in a tank having a first wall and a bottom wall, comprising the steps of:

mounting a bracket in the tank relative to the first wall;

floating a float on the level of the liquid in the tank;

recording a first position of the float with respect to the bracket;

biasing a compensation arm against the bottom wall;

recording a second position of the compensation arm with respect to the bracket; and comparing the first position to the second position to determine the level of the liquid in the tank.

* * * * *